US010793437B2

(12) United States Patent
Adolf et al.

(10) Patent No.: US 10,793,437 B2
(45) Date of Patent: Oct. 6, 2020

(54) METHOD FOR THE MANUFACTURE OF FE(II)P/FE(II)METP COMPOUNDS (71) Applicant: Chemische Fabrik Budenheim KG, Budenheim (DE)

(72) Inventors: Joachim Adolf, Mainz (DE); Dominik Braun, Langen (DE); Gerhard Eich, Ingelheim (DE); David Engers, Budenheim (DE); Bastian Ewald, Uelversheim (DE); Christian Litterscheid, Ober-Olm (DE); Rüdiger Wissemborski, Gau-Algesheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

(21) Appl. No.: 16/498,645

(22) PCT Filed: Mar. 26, 2018

(86) PCT No.: PCT/EP2018/057660
§ 371 (c)(1),
(2) Date: Sep. 27, 2019

(87) PCT Pub. No.: WO2018/178021
PCT Pub. Date: Oct. 4, 2018

(65) Prior Publication Data
US 2020/0095127 A1   Mar. 26, 2020

(30) Foreign Application Priority Data
Mar. 30, 2017 (DE) ........................ 10 2017 106 912

(51) Int. Cl.
C01B 25/37 (2006.01)
C01B 25/42 (2006.01)
C01B 25/44 (2006.01)
C01B 25/45 (2006.01)

(52) U.S. Cl.
CPC ............ C01B 25/375 (2013.01); C01B 25/42 (2013.01); C01B 25/44 (2013.01); C01B 25/45 (2013.01); *C01P 2002/72* (2013.01); *C01P 2004/51* (2013.01); *C01P 2004/61* (2013.01)

(58) Field of Classification Search
CPC ....... C01B 25/375; C01B 25/45; C01B 25/42; C01B 25/44; C01P 2004/61; C01P 2002/72; C01P 2004/51
See application file for complete search history.

(56) References Cited

U.S. PATENT DOCUMENTS

| 2002/0039552 | A1 | 4/2002 | Sapieszko et al. |
| 2002/0140137 | A1 | 10/2002 | Sapieszko et al. |
| 2008/0241492 | A1 | 10/2008 | Demartin Maeder et al. |
| 2010/0069650 | A1 | 3/2010 | Hibst et al. |
| 2010/0105926 | A1 | 4/2010 | Hibst et al. |
| 2010/0105927 | A1 | 4/2010 | Hibst et al. |
| 2012/0058039 | A1 | 3/2012 | Huang |
| 2014/0360240 | A1 | 12/2014 | Wissing et al. |
| 2015/0175804 | A1 | 6/2015 | Aepli |
| 2016/0340508 | A1 | 11/2016 | Kim et al. |
| 2017/0002193 | A1 | 1/2017 | Cheng et al. |
| 2020/0032028 | A1 | 1/2020 | Fünderich et al. |

FOREIGN PATENT DOCUMENTS

| CN | 101659406 B | * | 5/2011 | |
| DE | 39 17 294 A1 | | 11/1990 | |
| DE | 100 53 639 A1 | | 5/2002 | |
| DE | 10 2006 038 043 A1 | | 2/2008 | |
| DE | 10 2009 001 335 A1 | | 9/2010 | |
| DE | 10 2013 100 583 A1 | | 7/2014 | |
| EP | 0 917 597 B1 | | 1/2003 | |
| EP | 1 191 127 B1 | | 10/2004 | |
| EP | 1 274 288 B1 | | 3/2005 | |
| EP | 2 079 122 A1 | | 7/2009 | |
| JP | 2010-521400 A | | 6/2010 | |
| JP | 2010-521402 A | | 6/2010 | |
| JP | 2010-524809 A | | 7/2010 | |
| WO | WO-98/31630 A1 | | 7/1998 | |
| WO | WO-2005/052049 A1 | | 6/2005 | |
| WO | WO-2010/076265 A2 | | 7/2010 | |
| WO | WO-2012/055742 A2 | | 5/2012 | |
| WO | WO-2015/067545 A1 | | 5/2015 | |
| WO | WO-2016/064192 A1 | | 4/2016 | |
| WO | WO-2016/189023 A1 | | 12/2016 | |
| WO | WO-2018178022 A1 | * | 10/2018 | ............. C08L 77/06 |

OTHER PUBLICATIONS

Priority document for WO2018178022, DE102017106913.5, with machine translation. Dated Jan. 23, 2020. (Year: 2020).*
Chaiyasith, Pachernchaipa, et al., "A Simple Route to Synthesize Ferromagnetic Binary Calcium Iron Pyrophosphate CaFeP2O7 Using Aqueous-Acetone Media," Advanced Materials Research, vol. 717, 2013, pp. 44-48.
Swider, J. et al., "A novel concept for the synthesis of nanometric LiFePo4 by co-precipitation method in an anhydrous environment," Procedia Engineering, 98 (2014), pp. 36-41.
International Preliminary Report on Patentability dated May 3, 2019 for PCT/EP2018/057660.
German Search Report dated Nov. 7, 2017 for DE 10 2017 106 912.7.
Sitzia, Rita, "Infrared spectra of some natural phosphates," Rendiconti Del Seminario Della Facolta Di Scienze Dell 'Universita Di Cagliari, Bd. 36, Nr. 1-2, Jan. 1, 1966, Seiten 105-115.

(Continued)

Primary Examiner — Anthony J Zimmer
(74) Attorney, Agent, or Firm — Faegre Drinker Biddle & Reath LLP (57) ABSTRACT A method for the manufacture of crystal water-free iron(II) orthophosphate of the general formula $Fe_3(PO_4)_2$ or crystal water-free iron(II) metal orthophosphate, iron(II) metal pyrophosphate or iron(II) metal metaphosphate of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of K, Rb, Cs, Mg, Ca, Sr, Ba, the transition metals (d block), in particular Sc, Y, La, Ti, Zr, Hf, Nb, Ta, Cr, Mo, W, Mn, Cu, Zn and the metals and semimetals of the third, fourth and fifth main groups, in particular B, Al, Ga, In, Si, Sn, Sb, Bi and the lanthanoids.

12 Claims, 5 Drawing Sheets

(56) References Cited

OTHER PUBLICATIONS

U.S. Appl. No. 16/496,591, filed Sep. 23, 2019.
U.S. Appl. No. 16/498,481, filed Sep. 27, 2019.
Office Action dated Mar. 23, 2020 for JP 2019-553906.
Lyakhov N.Z. "Polucheniye metallicheskikh nanoporoshkov vosstanovlenjiyem v organicheskikh zhidkostyakh", Khimia v interesakh ustojchivogo razvitia, 22, 2014, pp. 409-416.
Office Action dated Jun. 5, 2020 for Eurasian patent application No. 201992301.

\* cited by examiner

METHOD FOR THE MANUFACTURE OF FE(II)P/FE(II)METP COMPOUNDS

CROSS REFERENCE TO RELATED APPLICATIONS

This application is a National Stage of International Application No. PCT/EP2018/057660 filed Mar. 26, 2018, which claims benefit of German Patent Application No. 10 2017 106 912.7 filed Mar. 30, 2017, both of which are herein incorporated by reference in their entirety.

SUBJECT MATTER OF THE INVENTION

This invention relates to a method for the manufacture of crystal water-free iron(II) orthophosphate of the general formula $Fe_3(PO_4)_2$ or
crystal water-free iron(II) metal orthophosphate, iron(II) metal pyrophosphate or iron(II) metal metaphosphate of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of K, Rb, Cs, Mg, Ca, Sr, Ba, the transition metals (d block), in particular Sc, Y, La, Ti, Zr, Hf, Nb, Ta, Cr, Mo, W, Mn, Cu, Zn, the metals and semimetals of the third, fourth and fifth main groups, in particular B, Al, Ga, In, Si, Sn, Sb, Bi and the lanthanoids or combinations of the above mentioned phosphates.

BACKGROUND OF THE INVENTION

A large number of different procedures for the manufacture of metal phosphate compounds are known from the literature. High temperature solid phase reactions, sol-gel processes, carbothermal syntheses and co-precipitation are mentioned by way of examples. The wide range of applications means that solvothermal syntheses and redox precipitation reactions to which heat treatment steps are often linked in order to convert the precursor compounds formed into the desired phase are particularly advantageous.

In the case of solvothermal syntheses, the reactants are converted in a suitable solvent in an autoclave at temperatures of 100-400° C. and at elevated pressure. The special reaction conditions improve the dissolving capacity of the solvent so reactions are possible using this method that would not occur under conditions with no pressure. Commonly used solvents include water (hydrothermal synthesis), short-chain alcohols, ammoniac and carbon dioxide.

In the case of redox precipitation reactions the reactants are placed in solution, suspension or mixture with one another for conversion, whereby oxidation and reduction processes occur resulting in a poorly soluble product which precipitates from the relevant medium.

WO 98/31630 A1 relates to a method for the manufacture of minerals containing synthetic phosphorous which should have improved composition homogeneity and modified crystal structures, in particular minerals containing calcium for cement compositions which should be suitable for use to repair and replace bones in orthopaedic procedures and dental procedures. In one example the manufacture of an iron(II) phosphate is described, whereby aqueous phosphinic acid solution, $H_3PO_2$, is mixed with iron(III) nitrate nonahydrate, $Fe(NO_3)_3 \cdot 9H_2O$, in a molar ratio of Fe/P of 1:1 and converted. The iron(III) nitrate is first dissolved, and in the conversion a yellow solid and $NO_x$ gas are produced, in addition to other products. The yellow solid was subjected to heat treatment in the air for one hour at 500° C. and then analysed using x-ray diffractometry (XRD). The authors of WO 98/31630 A1 state that the product of the heat treatment contained $Fe_3(PO_4)_2$ with a graftonite crystal structure as a main phase, along with further amorphous material. The x-ray diffractogram reproduced in WO 98/31630 A1 leaves no doubt however as to the fact that the product really does contain $Fe_3(PO_4)_2$ with a graftonite crystal structure as the main phase. The disadvantage of this method is also the obvious significant impurity of the product and the formation of $NO_x$ gas.

Swider, J. et al., Procedia Engineering, 98 (2014), 36-41, describes the synthesis of highly pure, nanocrystalline $LiFePO_4$ by means of co-precipitation in a water-free medium. $LiFePO_4$ is synthesised in a two-phase process. In order to do this, iron sulphate heptahydrate, $FeSO_4 \cdot 7H_2O$, and lithium acetate were dissolved in ethylene glycol in an inert atmosphere and added to ammonium dihydrogen phosphate in ethylene glycol drop by drop. A precipitate generated during the conversion was separated off, washed several times with acetone and dried in the air at 40° C. for 24 h. The interim product, known as $LiFePO_4$ precursor, was calcined at 550-750° C. for 12 h in an inert gas atmosphere. A disadvantage of this method is the long drying and calcination durations and the fact that both the co-precipitation and the calcination step have to be carried out in an inert gas atmosphere.

OBJECT

The object of the present invention is the provision of a method for the manufacture of crystal water-free iron(II) phosphate compounds of the type mentioned at the outset which overcomes the disadvantages of the method according to the prior art, in particular the low efficiency and undesirable side effects.

DESCRIPTION OF THE INVENTION

This object is achieved according to the invention by means of a method for the production of
crystal water-free monometallic iron(II) orthophosphate of the general formula $Fe_3(PO_4)_2$ or
crystal water-free mixed metal iron(II) metal orthophosphate, iron(II) metal pyrophosphate or iron(II) metal metaphosphate of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of K, Rb, Cs, Mg, Ca, Sr, Ba, the transition metals (d block), in particular Sc, Y, La, Ti, Zr, Hf, Nb, Ta, Cr, Mo, W, Mn, Cu, Zn, the metals and semimetals of the third, fourth and fifth main groups, in particular B, Al, Ga, In, Si, Sn, Sb, Bi and the lanthanoids or combinations of the above mentioned phosphates with the stages:
a) manufacture of a mixture containing:
  i) iron compounds (A) selected from Fe(III) compounds, Fe(III)/Fe(II) compounds and mixtures of these in a percentage of 20% to 90% by weight of the mixture selected from the group consisting of oxides, hydroxides, oxide hydroxides, carbonates, carboxylates such as oxalates, formates, acetates, citrates, lactates, orthophosphates, phosphonates, metaphosphonates, pyrophosphates, sulphates and mixtures of those mentioned above, ii) reduction agents (B) in a percentage of 5% to 50% by weight of the mixture selected from the group consisting of phosphonic acid [$H_3PO_3$], phosphorus trioxide [$P_2O_3$], phosphinic acid [$H_3PO_2$], phosphorus tetroxide [$P_2O_4$], hypodiphosphoric acid [$H_4P_2O_6$], diphosphoric acid [$H_4P_2O_5$], hypodiphosphonic acid [$H_4P_2O_4$], Fe salts and Met salts of the above mentioned acids and mixtures of the above as solids, aqueous solutions or suspensions, iii) optional phosphate donor (C) in a percentage of 0% to 50% by weight of the mixture selected from phosphoric acid [$H_3PO_4$] as an aqueous solution, metal phosphate [$Met_x(PO_4)_z$] or acid metal phosphate [$Met_xH_y(PO_4)_z$] with $1 \geq x \geq 4$, $1 \geq y \geq 5$ and $1 \geq z \geq 4$ as a solid or aqueous solutions or suspension, diphosphoric acid [$H_4P_2O_7$], metaphosphoric acid [$(HPO_3)_n$] with $n \geq 3$ or their salts, phosphorus pentoxide [$P_2O_5$] or mixtures of the above, where Met is defined as above, iv) optional metal (Met) donor (D) in a percentage of 0% to 50% by weight of the mixture selected from metal compounds of one or more metals from the group consisting of K, Rb, Cs, Mg, Ca, Sr, Ba, the transition metals (d block), in particular Sc, Y, La, Ti, Zr, Hf, Nb, Ta, Cr, Mo, W, Mn, Cu, Zn, and the metals and semimetals of the third, fourth and fifth main group, in particular B, Al, Ga, In, Si, Sn, Sb, Bi, and the lanthanoids, and selected from the oxides, hydroxides, oxide hydroxides, carbonates, oxalates, formates, acetates, citrates, lactates, orthophosphates, pyrophosphates and sulphates of the above mentioned metals and mixtures of these, whereby the share of the weight of components (A) to (D) of the mixture is based on the percentage of the substances not including any solvent and/or suspension agent, b) the mixture obtained, where it contains aqueous and/or organic solvents, is dried at a temperature of less than 400° C., c) the dry or dried mixture is treated at a temperature in the range from 400 to 1200° C.

In an embodiment of the invention, the product manufactured according to the invention is or comprises crystal water-free monometallic iron(II) orthophosphate of the general formula $Fe_3(PO_4)_2$. The term "monometallic" means that the product only contains iron(II) as a metallic (cationic) component).

In further embodiments of the invention, the product according to the invention is or comprises crystal water-free mixed metal iron(II) metal orthophosphate, iron(II) metal pyrophosphate or iron(II) metal metaphosphate of the general molecular formula $Fe_aMet_b(PO_c)_d$, where a is a number from 1 to 5, b is a number from >0 to 5, c is a number from 2.5 to 5, and d is a number from 0.5 to 3. The term "mixed metal" means that the product contains at least one further metal in addition to iron(II) as the metallic (cationic) components, and this is abbreviated to "Met" here.

In the products according to the invention, the phosphorous is present in oxidation stage (V). Low percentages of phosphorous in other stages of oxidation cannot be ruled out as a result of the manufacturing and should be covered by the protection in the scope of unavoidable impurities.

The products according to the invention are derived from orthophosphoric acid ($H_3PO_4$) and its condensates (polymers). Orthophosphates have the anionic structural unit [$PO_4^{3-}$], pyrophosphates and diphosphates have the structural unit [$P_2O_7^{4-}$] and the cyclic metaphosphates have the structural unit=[$(PO_3^-)_n$].

Stages a), b) and c) of the method according to the invention including specific embodiments are described in greater detail below.

Stage a)

The manufacture of the mixture of the reactants according to the invention of the iron compound (A) and the reduction agent (B) and optional phosphate donor (C) and metal (Met) donor (D) in stage a) of the method according to the invention can be achieved by means of the dissolving, suspending and/or mixing of the components in an aqueous or organic solvent or without an additional solvent.

The share of the weight of components (A) to (D) of the mixture indicated here is based on the percentage of the substances not including any solvent and/or suspension agent. For example, where phosphoric acid [$H_3PO_4$] is introduced as a phosphate donor (C) and used as an aqueous solution, the share of the weight of the $H_3PO_4$ will be indicated not including the water introduced as a solvent.

The manufacture of a suspension in a polar solvent which contains at least one of the reactants suspended can be advantageous as the product is normally well soluble in common polar solvents and this can encourage the progress of the reaction.

A polar solvent is preferably used to manufacture the mixture according to the invention in stage a), ideally a solvent with a low level of viscosity and/or with a low boiling point, as this results in the subsequent drying step being simplified and accelerated considerably, in particular when the spray drying procedure is used. Water, alcohols and polyols of a low chain length and ammoniac and mixtures of the above are suitable. Water is particularly preferable as it has a low level of viscosity and very good solubility properties.

The solvent and/or suspending agent can be present in a ratio of 10 to 0.1 in relation to the total mass of the mixture not including the solvent and/or suspension agent. A weight ratio of 8 to 1 is preferred, particularly preferably 4 to 1. A high percentage of solvent and/or suspending agent can simplify the processing of the mixture while a low percentage of solvent and/or suspension agent shortens the subsequent drying step accordingly.

In a preferred embodiment of the invention the Fe(III) and/or Fe(III)/Fe(II) compounds used as iron compounds (A) are selected from oxides, hydroxides, oxide hydroxides, orthophosphates, pyrophosphates, metaphosphates and sulphates. These have the advantage that the anion is stable during the mixing and drying process. In this context, stable means that no undesirable decomposition and/or redox reactions occur. These anions also offer the advantage that they do not release any undesirable by-products during the redox processes which occur during temperature treatment stage c). This means that a product with more uniform particle size distribution and porosity can be obtained. In addition to this, no costly purification of the reaction atmosphere is necessary as is sometimes the case in methods known from the literature. The use of Fe(III) and/or Fe(III)/Fe(II) orthophosphates, pyrophosphates and metaphosphates has the further advantage that they also provide phosphate ions containing phosphorous in oxidation stage (V) for the formation of the product.

The percentage of the iron compound (A) in the mixture manufactured in stage a) is 20% to 90% by weight, preferably 25% to 85% by weight, particularly preferably 30% to 75% by weight based on the total weight of all components i) to iv) not including any solvent or suspension agent.

In a preferred embodiment of the invention the reduction agent (B) is selected from phosphonic acid, phosphinic acid, hypodiphosphoric acid, diphosphonic acid and hypodiphosphonic acid or mixtures of these. These are easier to handle as a solution and enable very simple process control and dosing of the substances.

Alternatively or as a supplementary measure, the acid anhydrides phosphorus trioxide, phosphorus tetroxide or a mixture of these can be used as reduction agent (B) according to the invention. The use of an anhydride has the advantage that the drying step b) carried out after stage a) can be carried out comparatively quickly due to the low water content of the anhydride.

The percentage of the reduction agent (B) in the mixture manufactured in stage a) is 5% to 50% by weight, preferably 7.5% to 40% by weight, particularly preferably 10% to 30% by weight based on the total weight of all components i) to iv) not including any solvent or suspension agent.

The mixture manufactured in stage a) can further contain a phosphate donor (C) which brings phosphate ions with phosphorous into the mixture in oxidation stage (V). It is advantageous to add the additional phosphate donor (C) in such a quantity that the phosphate ions generated from the reduction agent (B) during the temperature treatment stage c) and the phosphate ions introduced by the phosphate donor (C) are present in a molar quantity in relation to the Fe ions, and where applicable the Met ions, that sufficient phosphate ions are provided for the formation of the product. The use of aqueous, strongly acidic solutions of phosphoric acid as phosphate donors is advantageous due to the good availability, the simple dosing and the very low price. The use of the corresponding acid anhydride $P_2O_5$ is linked to the advantage that the drying step which is carried out after the mixing can be carried out significantly more quickly due to the low water content.

Through the selection of the percentages of phosphate donor (C) and reduction agent (B), both of which contribute to the percentage of phosphate in the end product, the advantage of the reducing effect of the reduction agent (B) in the mixture can also be controlled or adjusted in order to prevent, for example an overreduction, e.g. to a phosphide, and simultaneously to provide sufficient phosphorous compounds to obtain the desired product.

The percentage of the additional phosphate donor (C) in the mixture manufactured in stage a) is 0% to 50% by weight, preferably 0% to 40% by weight, particularly preferably 0% to 30% by weight based on the total weight of all components i) to iv) not including any solvent or suspension agent.

The mixture manufactured in stage a) can further contain an additional metal donor (D). In the manufacture according to the invention of crystal water-free mixed metallic iron(II) metal orthophosphate, iron(II) metal pyrophosphate or iron (II) metal metaphosphate of the general formula $Fe_aMet_b(PO_4)_d$, this metal donor (D) provides "Met" in addition to metal components containing iron where these have not been provided to a sufficient extent by means of the phosphate donor. It is understood that the metal donor (D) and phosphate donors (C) containing "Met" are not used in the manufacture of crystal water-free monometallic iron(II) orthophosphate according to the invention.

According to the invention, the metal (Met) donor (D) is selected from the group consisting of oxides, hydroxides, oxide hydroxides, carbonates, oxalates, formates, acetates, citrates, lactates, orthophosphates, pyrophosphates, sulphates and mixtures of these. The use of hydroxides, oxide hydroxides, carbonates, oxalates, formates, acetates, citrates and/or lactates has the advantage that no residues of the anion remain in the product from these compounds as impurities after the temperature treatment in stage c). The use of orthophosphates and pyrophosphates has the advantage that phosphate ions are simultaneously provided for the formation of the end product.

The percentage of the additional metal donor (D) in the mixture manufactured in stage a) is 0% to 50% by weight, preferably 0% to 40% by weight, particularly preferably 0% to 30% by weight based on the total weight of all components i) to iv) not including any solvent or suspension agent.

The manufacture of the mixture is ideally carried out in a stirred batch container (vessel) with or without solvents or suspension agents. The use of at least one stirring device such as propeller stirrers, turbine blade stirrers, disc stirrers, wobble plate stirrers, hollow blade stirrers, impeller stirrers, cross-arm stirrers, anchor stirrers, blade stirrers, lattice stirrers, gas inlet stirrers, spiral stirrers, toothed disc stirrers, residual quantity stirrers, jet stream mixers, dispersers and combinations of these assemblies is advantageous. In a particularly preferred variant, the manufacture of the mixture occurs with the simultaneous use of at least one uniaxial stirrer (blade stirrers, bar stirrers, perforated bar stirrers, cross-arm stirrers, propeller stirrers, turbine stirrers, disc stirrers, impeller stirrers) with 1 to 3 stirring levels and at least one dispersion assembly in the form of high-speed stirrers or dispersers such as toothed discs or dispersers. In a further preferred variant at least one dispersing assembly is arranged outside of the vessel in a continuous pumping circuit by means of which the solution or suspension is continuously pumped in a circuit. In a further preferred variant, the manufacture of the mixture takes place in a batch container which has heating and/or cooling elements in the shape of built-in spirals or a double shell in order to adjust the temperature of the mixture. Furthermore, the heating of the mixture according to the invention can be carried out with the help of a steam distributor. In a further preferred variant, the temperature control of the mixture according to the invention has a pumping circuit on the reactor which is equipped with a heat exchanger.

For the method according to the invention in which the mixture is a solution or a suspension, the batch container in a preferred embodiment is equipped with at least one return condenser in order to essentially prevent a change in the solid content caused by evaporating solvents.

In a further variant in which the mixture is a solution or a suspension, the manufacture of the mixture according to the invention takes place in the temperature range between 10° C. or room temperature and the boiling point of the solution or suspension, preferably at a temperature of <150° C. A temperature range of 20° C. to 100° C. is preferred, particularly preferably 40° C. to 90° C. Furthermore, the manufacture of the solution or suspension according to the invention can be carried out at temperatures above the boiling point of the liquid using a closed container at the autogenous pressure of the solvent at the corresponding temperature.

Stage b)

The mixture manufactured in stage a) of the method according to the invention is dried at a temperature of less than 400° C. in the subsequent stage b) if it contains aqueous and/or organic solvents. The temperature of less than 400° C. indicates the temperature of the mixture to be dried in the drying process. The temperature of the ambient atmosphere may be higher than this depending on the drying procedure.

In this context, drying means that water and/or other solvents are removed from the mixture to the extent that the water and/or other solvent content is a maximum of 5% by weight of the total mass of the mixture, preferably no more than 3% by weight, particularly preferably no more than 0.8% by weight. The degree of drying can be determined for example using thermogravimetry (TGA).

The drying of the mixture in stage b) can be carried out using any suitable drying process, for example freeze drying, supercritical drying, microwave drying, vacuum drying, convective drying such as convective air drying or convective drying in an inert gas atmosphere, spray drying, spray granulation or drying in a rotary kiln.

Particularly preferred drying processes include convective drying in an inert gas atmosphere and spray drying or spray granulation as these keep the tendency of the product to oxidise low. Spray drying is even more preferable as this is highly energy efficient and provides a product with even particle size distribution. In the case of drying using convective methods, for example in a rotary kiln, the temperature of the drying gas can be up to 600° C. if the drying is carried out in an inert gas atmosphere. If this is the case, the temperature of the mixture to be dried may not exceed 400° C. If the convective drying is not carried out in an inert gas atmosphere, the temperature of the drying gas should not exceed 400° C., preferably 300° C., particularly preferably 250° C. in order to decrease the oxidation of the reduction agent in the mixture with oxygen.

Spray Drying

In a preferred manufacturing variant the drying of the products according to the invention is carried out in stage b) by means of the vaporisation of the solution or suspension manufactured according to the invention in a hot gas flow in a spray dryer. Hot gas and the product flow are guided in continuous flow or counter flow and the vaporisation is achieved using at least one pressure nozzle, a single-substance nozzle or a two-substance nozzle or at least one rotation vaporiser or combinations of these. Drying in a continuous current procedure is particularly preferable. Heated air, air containing burner exhaust gas, oxygen-reduced air enriched with nitrogen or inert gases, and nitrogen can preferably serve as a hot gas flow. The use of heated air and air containing burner exhaust gases is particularly preferable. The heating of the hot gas flow is preferably carried out by means of at least one burner, hot gas generator, electric gas heater or steam heat exchangers or combinations of these. The use of at least one two-substance nozzle or a rotation vaporiser is particularly preferable during vaporisation. Particularly preferably, the vaporisation is carried out in a two-substance nozzle using compressed air, nitrogen or hot steam at a pressure of 1.0 to 6.0 bar. More preferable is the use of compressed air in the pressure range from 1.5-3.0 bar.

The separation of the dried product flow from the process gas flow is preferably achieved using at least one cyclone or at least one filter or combinations of these. The use of a filter is particularly preferable.

The average particle size of the product obtained is in the range from 1 to 15 μm (d50).

Spray Granulation

In a further preferred manufacturing variant, the drying of the products according to the invention is carried out by means of the vaporisation of the solution or suspension manufactured according to the invention on a fluidised bed in a hot gas flow made of already dried goods in a spray granulator with at least one granulation zone. The vaporisation of the solution or suspension according to the invention is achieved using at least one nozzle, a single-substance nozzle, a two-substance nozzle, a multiple-substance nozzle or a combination of these. The manufacturing can be in batches or continuously. The vaporisation is preferably carried out in a two-substance nozzle using compressed air, nitrogen or hot steam at a pressure of 1.0 to 6.0 bar. The use of compressed air in the pressure range from 1.5-3.0 bar is particularly preferable.

In a particularly preferred embodiment, the spray granulation is carried out with a granulation zone in continuous operation by means of the continuous spraying-on of the solution or suspension and the continuous removal of dried granulate from the fluidised bed. Heated air, heated air containing burner exhaust gas, heated oxygen-reduced air enriched with nitrogen or inert gases, and heated nitrogen are suitable as hot gas flows. The use of heated air and heated air containing burner exhaust gases is particularly preferable.

In a further preferred embodiment, the drying of the solution or suspension according to the invention as described above is carried out continuously in a spray granulator with several fluidised zones, particularly preferably 2 to 5 zones. In a particularly preferred variant, the final fluidised zone is used to cool the product and is fluidised and held without the spraying-on of the solution or suspension according to the invention with cool gas.

In the spray granulation method, the necessary fluidised layer in the spray granulator is advantageously continuously generated by abrasion and spray drying and provided by means of filters or filter return in the device. In a particularly preferred embodiment, the granulation system also has a sieving and grinding cycle from which on the one hand the dry product according to the invention is separated from particles which are too coarse and those which are too fine by means of sieving, and the coarse and fine fractions are added back to the spray granulator as a fluidising layer by means of grinding. The hot has generation for the spray granulation occurs in the same way as the hot gas generation in spray drying.

The average particle size (d50) of the granulates generated in this way are ideally in the range from 150 to 2000 μm, preferably 150 to 1000 μm, particularly preferably 300 to 800 μm.

Stage c)

The dried mixture is then subject to temperature treatment (calcination) in the range from 400 to 1200° C., preferably 500 to 1100° C., particularly preferably 600 to 1000° C. The temperature should be selected to be high enough that a melting of all of the substances involved in the reaction is ensured. In addition to this, a high temperature leads to high ion mobility and therefore to rapid reaction kinetics with a corresponding impact on the necessary reaction duration.

The temperature treatment of the products according to the invention is carried out in batches or continuously in an inert or reducing atmosphere, preferably nitrogen, inert gas, forming gas with a maximum concentration of 5% by volume $H_2$ or combinations of these. The percentage by volume of oxygen in the process gas is ideally 0.0% to 1.0% by volume, preferably less than 0.3% by volume, particularly preferably less than 0.03% by volume. The use of the forming gas is particularly preferably "95/5", in other words 95% by volume nitrogen ($N_2$) and 5% by volume hydrogen ($H_2$).

In a preferred embodiment, the temperature treatment in stage (c) is carried out as continuous operation in a controlled atmosphere, whereby the process gas atmosphere is guided in a continuous flow with the product or in counter-flow to the product.

In a further preferred variant, the compounds according to the invention are treated with thermal treatment with counter flowing process gases in a rotary kiln with a cooling zone connected. The process gas is introduced on the cool zone side and flows over the cooling product in order to prevent oxidation. The use of indirectly heated rotating drums with at least one heated zone but preferably two to eight heating zones which can be independently regulated is particularly preferred. Indirect heating can occur in very many varied ways, typically with electrical resistance heating (heating elements, heating coils), with gas burners, with oil burners, through induction etc. Electrical resistance heating and gas burners are preferable.

In a further preferred embodiment, the rotating drum has fittings inside in the shape of lifting paddles, preferably two to six lifting paddles extending in a radial direction, which improve the mixing of the solids with the gas phase and promote the transfer of heat on the wall side. Furthermore, lifting paddles or fittings with axial conveyor components which are suitable to shorten the residence time in the rotating drum are advantageous. Suitable rotating drums have gas-flushed seals which are applied in an inert gas atmosphere or reduced atmosphere in order to prevent the penetration of oxygen. Atmospheric separation is advantageously carried out by means of double shuttle valves, rotary valves and/or rinsed screws. Covering the product in question with a layer of inert or reducing atmosphere on minimises the entry of oxygen into the kiln.

In the temperature treatment in stage c), inter alia the Fe(III) ions brought into the mixture by the iron compound (A) should be reduced to Fe(II) ions.

In a preferred embodiment, the temperature treatment in stage c) is carried out in a rotary kiln. This enables a continuous temperature treatment procedure to be carried out which is therefore generally more cost-effective than a batch procedure. The use of an indirectly heated rotary kiln is particularly preferable as this enables the precise control of the atmosphere in the product area.

The temperature treatment in stage c) of the method according to the invention can advantageously be carried out in an inert gas atmosphere, in other words the atmosphere is made up of a gas or a gas mixture which does not react with the components of the mixture in the relevant temperature range. $N_2$ or noble gases, particularly argon, are suitable as inert gases.

In a preferred embodiment of the method according to the invention, the temperature treatment in stage c) is carried out in a reducing gas atmosphere. In this context, a reducing gas atmosphere means that this contains a least one reducing gas component which is suitable to reduce components of the treated mixture, in particular to reduce the Fe(III) ions introduced to the mixture by the iron compound (A) to Fe(II) ions. Suitable reducing gas components are CO and $H_2$. The use of forming gas containing 5% by volume $H_2$ in $N_2$ is particularly preferable as this is neither flammable nor toxic.

Carrying out the majority of the reduction of the Fe(III) ions to Fe(II) ions using the reduction agent (B) and the remainder of the reduction using a reduction gas atmosphere is particularly preferable according to the invention. This can suppress both the formation of free carbon and the formation of metal phosphides.

In a preferred embodiment of the method according to the invention, the mixture manufactured in stage a) contains Fe(III) ions in a molecular ratio to the reduction agents (B), which based on the stoichiometry and assuming 100% conversion would provide a reduction of 70% to 99%, preferably 80% to 98%, particularly preferably 90% to 95% of the Fe(III) ions to Fe(II) ions through the reduction agent (B). Where high percentages of reduction agents are required from a stoichiometric perspective, there is a risk of the formation of metal phosphides and/or elemental metals which make the product impure and can dye it a dark colour. According to the invention, the assumption should be made that 100% stoichiometric conversion or reduction of Fe(III) ions will not occur as a result of the reduction agent (B) used. The remainder of the reduction can be achieved by the reducing gas atmosphere.

Using the example of phosphonic acid [$H_3PO_3$] as a reduction agent with phosphorous in oxidation stage (III), this would correspond to a stoichiometric ratio of P(III) atoms in the reduction agent to Fe(III) ions of 0.35:1 to 0.495:1 with an assumed reduction of 70% to 99%.

A particular advantage of the method according to the invention lies in the high efficiency and the avoidance of undesirable side reactions which lead to the formation of impurities. A further advantage is that no additional reduction agents such as elemental metals are needed to reduce Fe(III) to Fe(II). The reduction can be carried out solely by means of the oxidation of phosphorus and oxygen compounds with an oxidation level of the phosphorous of <5, whereby a reducing atmosphere in stage c) of the temperature treatment can supplement the reduction in order to avoid the risk of the formation of metal phosphides and/or elemental metals.

A further advantage of the method according to the invention is the short residence and reaction times compared to known methods for the synthesis of iron(II) phosphate, pyrophosphate and metaphosphate compounds. The temperature treatment in stage c) in line with the method according to the invention can be carried out very efficiently with residence and reaction times of less than four hours, in many cases even in less than one to two hours. In contrast to this, common syntheses according to the prior art are sometimes associated with residence or reaction times of more than 24 hours.

In an embodiment of the invention the manufactured product is crystal water-free iron(II) orthophosphate of the general formula $Fe_3(PO_4)_2$ with a graftonite crystal structure. Among other things, this product is particularly suitable as an absorber of electromagnetic radiation, in particular IR radiation, and to this end can advantageously be integrated into a carrier material, preferably into thermoplastic polymers.

Particularly advantageous iron(II) metal metaphosphates of the general formula $Fe_aMet_b(PO_c)_d$ are those in which "Met" is selected from the group of potassium, magnesium, manganese and zinc. The products of these compositions according to the invention are inter alia suitable for use in products which come into contact with foods, such for example as packaging materials for foods, as compositions of this kind do not currently require any special authorisation under food law, at least in many countries.

In a further embodiment of the invention, the iron(II) phosphate manufactured is a mixed metal crystal water-free iron(II) metal orthophosphate of the general formula $Fe_aMet_b(PO_c)_d$, where Met represents one or a combination of the metals potassium (K), magnesium (Mg) and zinc (Zn), preferably potassium (K) alone or in combination with either magnesium (Mg) or zinc (Zn), where the iron(II) metal orthophosphate is particularly preferably $KFePO_4$, $K(Fe_{0.75}Zn_{0.25})PO_4$ or $K(Fe_{0.75}Mg_{0.25})PO_4$.

In a further embodiment of the invention, the iron(II) phosphate manufactured is a mixed metal crystal water-free iron(II) metal pyrophosphate of the general formula $Fe_aMet_b(P_2O_7)_d$, where Met represents one or a combination of the metals magnesium (Mg), calcium (Ca), strontium (Sr) and barium (Ba), whereby the iron(II) metal pyrophosphate is particularly preferably $MgFeP_2O_7$, $CaFeP_2O_7$, $SrFeP_2O_7$ or $BaFeP_2O_7$.

Like the above mentioned iron(II) orthophosphate with the graftonite structure, the above mentioned mixed metal crystal water-free iron(II) metal orthophosphates and pyrophosphates are inter alia particularly suitable as absorbers for electromagnetic radiation, in particular IR radiation, and to this end can also be advantageously embedded into a carrier material, preferably in thermoplastic polymers.

Material obtained in stage (c) is preferably adjusted to a particle size of (d50) <150 µm, preferably <30 µm, particularly preferably <4 µm.

The invention will now be described in greater detail through embodiments and the attached figures.

EXAMPLES

X-Ray Diffractometry (XRD)

Of the products manufactured according to the examples below, x-ray diffraction measurements (XRD) are taken using a D8 Advance A25-type diffractometer (Bruker) and CuKα radiation.

The products and their crystal structures were identified on the basis of corresponding reference diffractograms (Powder Diffraction Files; PDF) from the ICDD (International Centre for Diffraction Data), previously JCPDS (Joint Committee on Powder Diffraction Standards) database. If no PDF cards were available for the products manufactured, PDF cards for isotype compounds were used (=compounds of the same structural type).

Elementary Analysis

Elementary analyses were carried out by means of x-ray fluorescence analysis (XRF) using an Axios FAST spectrometer (PANalytical) in order to determine and confirm the stoichiometries of the products manufactured.

Particle Size Determination

The person skilled in the art can use common methods such as light scattering and microscopic methods to determine the average particle size. The average particle sizes indicated here were determined used a laser particle size measuring device (model LA-950V2 by Horiba; software version 7.2).

Manufacturing Example 1—Crystal Water-Free $Fe_2P_2O_7$

Figure 1:
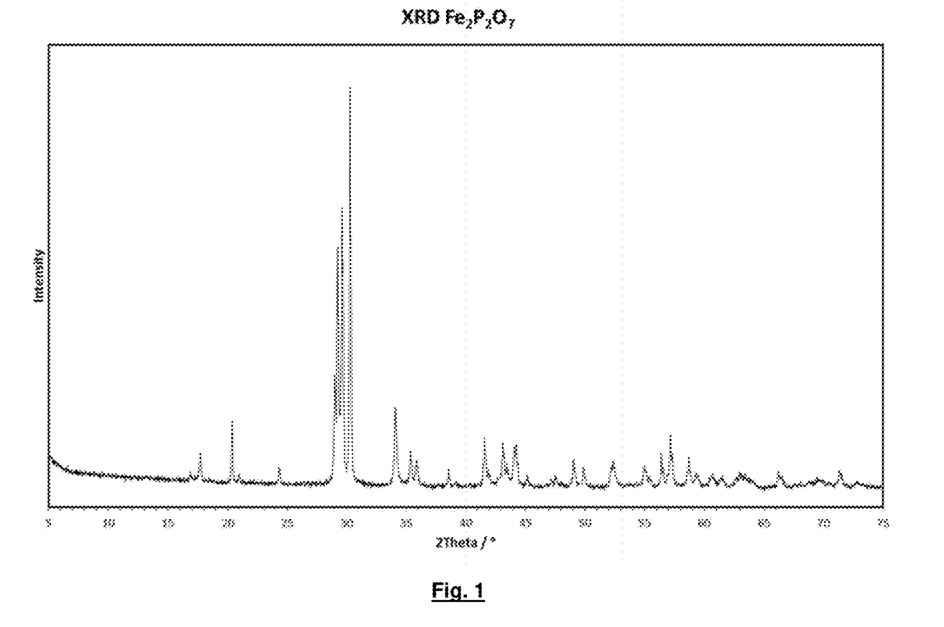
FIG. 1 shows the x-ray diffractogram of crystal water-free $Fe_2P_2O_7$ manufactured according to the invention in line with manufacturing example 1.

A suspension of
i) 35.5 kg iron(III) oxide-hydroxide [FeO(OH) or $Fe_2O_3 \cdot 1H_2O$],
ii) 16.5 kg 98% phosphonic acid [$H_3PO_3$],
iii) 26.5 kg 75% phosphoric acid [$H_3PO_4$] and
LA: 220 kg water
was spray granulated. The granulate obtained in this way was temperature treated in a rotary kiln for an average residence time of 4 h in a form gas atmosphere (5% by volume $H_2$ in $N_2$) at 700° C. An almost colourless to slightly pink product is obtained. The x-ray diffractogram (XRD) of the product is shown in FIG. 1. The product was identified using PDF card 01-072-1516.

Figure 2:
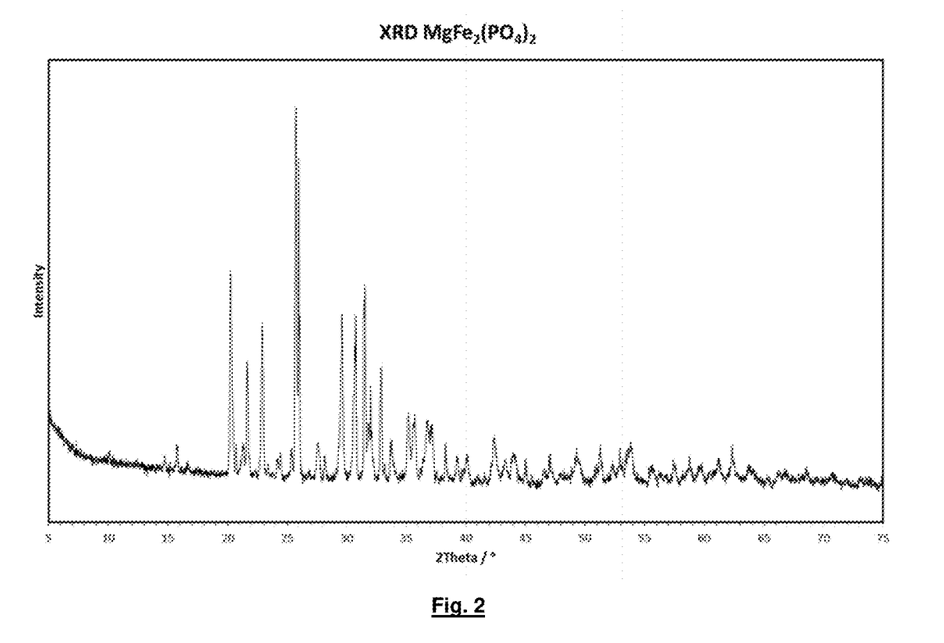
FIG. 2 shows the x-ray diffractogram of crystal water-free $Mg_{1.5}Fe_{1.5}(PO_4)_2$ and $Fe_3(PO_4)_2$ manufactured according to the invention in line with manufacturing example 2.

Manufacturing Example 2—Phase Mixture of Crystal Water-Free $Mg_{1.5}Fe_{1.5}(PO_4)_2$ and $Fe_3(PO_4)_2$ A suspension of
i) 8.45 kg iron(III) oxide-hydroxide [FeO(OH) or $Fe_2O_3 \cdot 1H_2O$],
ii) 7.95 kg 98% phosphonic acid [$H_3PO_3$],
iii) 19.6 kg iron(III) phosphate dihydrate [$FePO_4 \cdot 2H_2O$],
iv) 8.43 kg magnesium carbonate [$MgCO_3$] and
LA: 160 kg water
was spray granulated. The granulate obtained in this way was temperature treated in a rotary kiln for an average residence time of 3 h in a form gas atmosphere (5% by volume $H_2$ in $N_2$) at 750° C. An almost colourless product is obtained. The x-ray diffractogram (XRD) of the product is shown in FIG. 2. The product was identified using the PDF cards as a phase mixture of a main phase $Mg_{1.5}Fe_{1.5}(PO_4)_2$ (PDF card 01-071-6793) and a subsidiary phase Fe3(PO4)2 (PDF card 00-49-1087).

Manufacturing Example 3—Crystal Water-Free $Fe_3(PO_4)_2$

Figure 3:
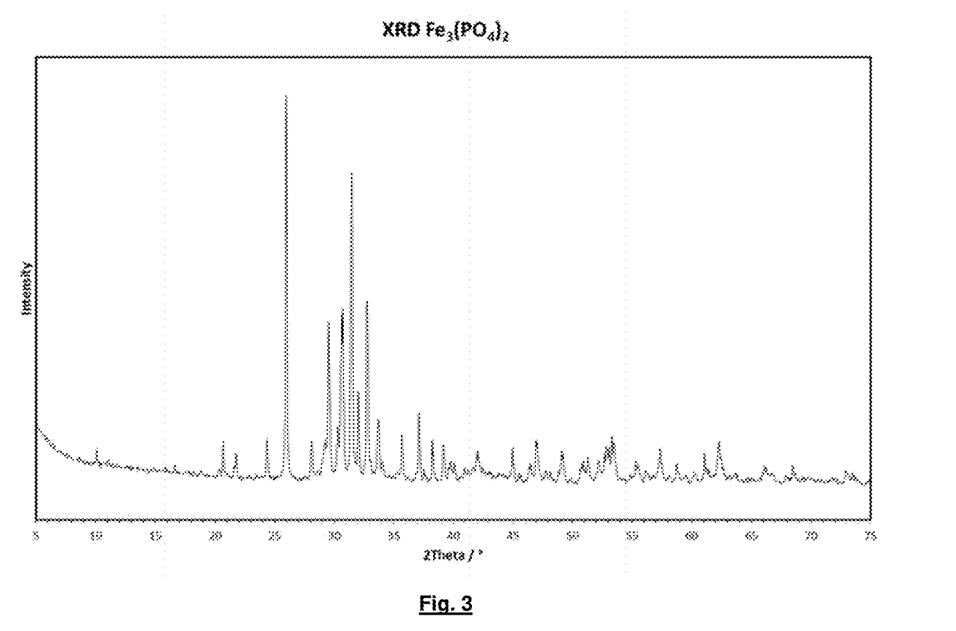
FIG. 3 shows the x-ray diffractogram of crystal water-free $Fe_3(PO_4)_2$ manufactured according to the invention in line with manufacturing example 3.
Figure 9:
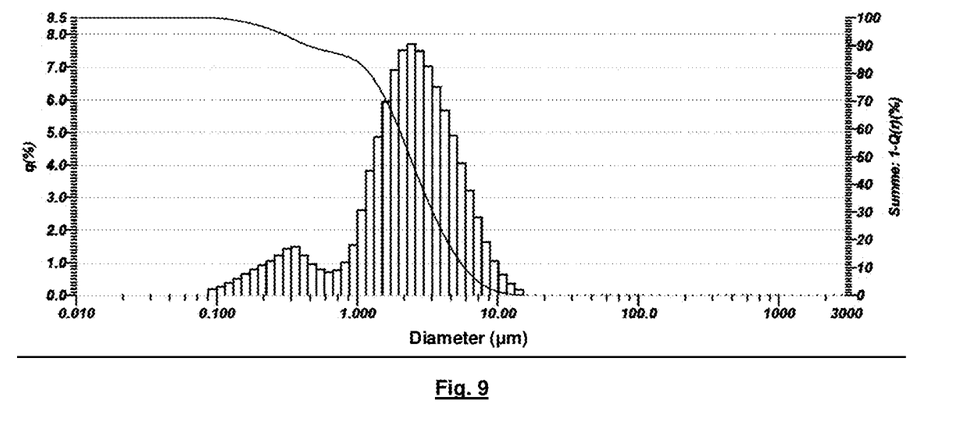
FIG. 9 shows the particle size distribution of crystal water-free $Fe_3(PO_4)_2$ manufactured according to the invention in line with manufacturing example 3.

A suspension of
i) 21.75 kg iron(III) oxide-hydroxide [FeO(OH) or $Fe_2O_3 \cdot 1H_2O$],
ii) 12.15 kg 98% phosphonic acid [$H_3PO_3$],
iii) 10.3 kg iron(III) phosphate dihydrate [$FePO_4 \cdot 2H_2O$] and
LA: 140 kg water
was spray granulated. The granulate obtained in this way was temperature treated in a rotary kiln for an average residence time of 90 minutes in a form gas atmosphere (5% by volume $H_2$ in $N_2$) at 750° C. An almost colourless product is obtained. The x-ray diffractogram (XRD) of the product is shown in FIG. 3. The product crystallises in the graftonite structure and was identified using PDF card 00-49-1087. The product was ground such that 50% by weight of the product had a particle size of less than 3 μm. The particle size distribution of the ground product is shown in FIG. 9.

Manufacturing Example 4—Manufacture of Crystal Water-Free KFe(PO$_4$)

Figure 4:
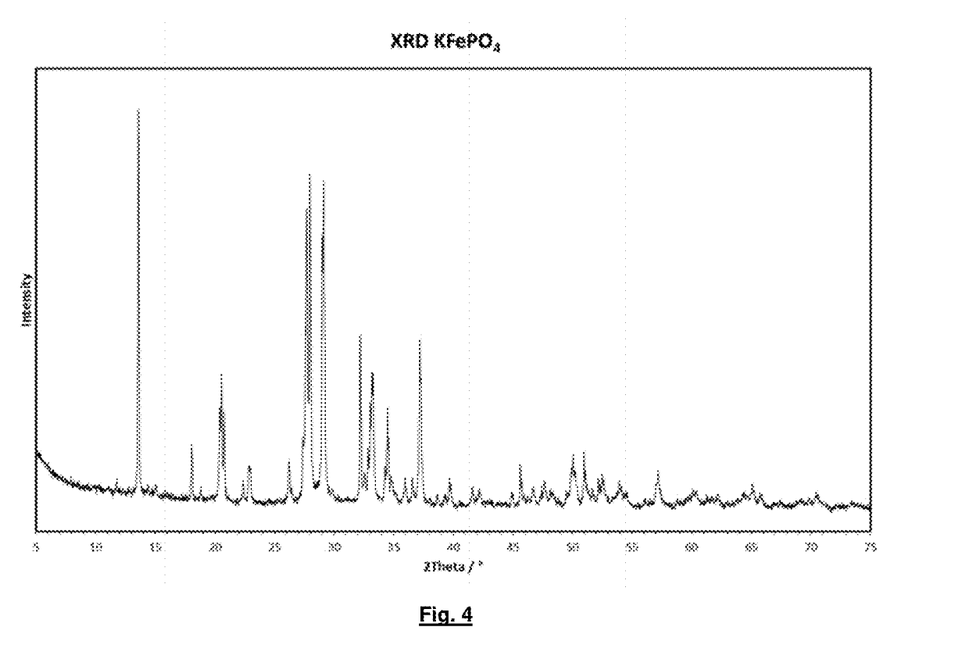
FIG. 4 shows the x-ray diffractogram of crystal water-free $KFe(PO_4)$ manufactured according to the invention in line with manufacturing example 4.

A suspension of
i) 11.80 kg iron(III) oxide-hydroxide [FeO(OH) or Fe$_2$O$_3$ 1H$_2$O],
ii) 10.70 kg 98% phosphonic acid [H$_3$PO$_3$],
iii) 24.8 kg iron(III) phosphate dihydrate [FePO$_4$ 2H$_2$O]
IV) 29.8 kg 50% lye [KOH]
V) 1.0 kg 75% phosphoric acid [H$_3$PO$_4$] and
LA: 110 kg water
was spray granulated. The granulate obtained in this way was temperature treated in a rotary kiln for an average residence time of 3 h in a form gas atmosphere (5% by volume H$_2$ in N$_2$) at 650° C. A pale light green product is obtained. The x-ray diffractogram (XRD) of the product is shown in FIG. 4. The product was identified using PDF card 01-076-4615.

Manufacturing Example 5—Crystal Water-Free KFe$_{0.90}$Zn$_{0.10}$(PO$_4$)

Figure 5:
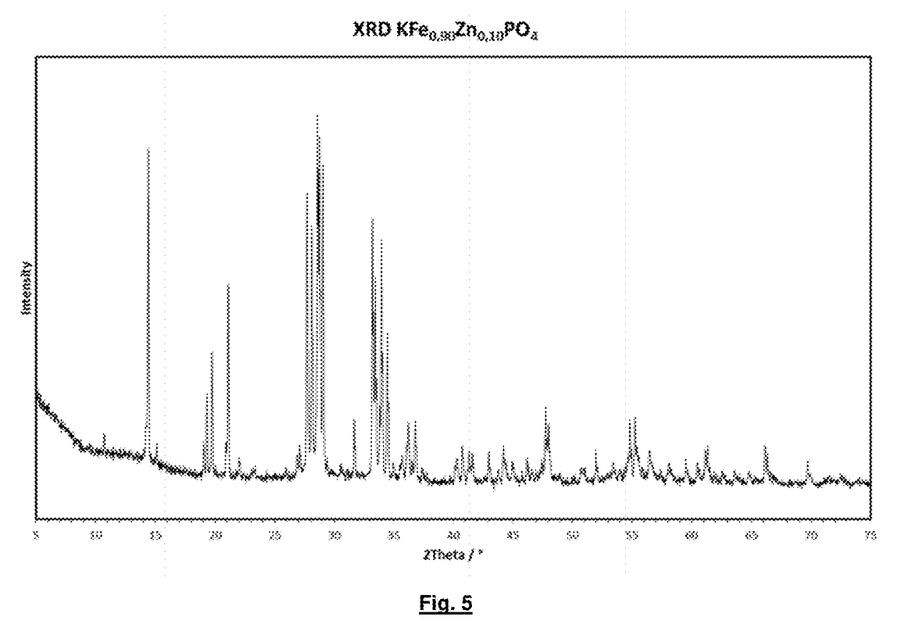
FIG. 5 shows the x-ray diffractogram of crystal water-free $KFe_{0.90}Zn_{0.10}(PO_4)$ manufactured according to the invention in line with manufacturing example 5.

A suspension of
i) 10.60 kg iron(III) oxide-hydroxide [FeO(OH) or Fe$_2$O$_3$ 1H$_2$O],
ii) 9.65 kg 98% phosphonic acid [H$_3$PO$_3$],
iii) 22.30 kg iron(III) phosphate dihydrate [FePO$_4$ 2H$_2$O]
IV) 2.15 kg zinc oxide [ZnO]
IV) 29.8 kg 50% lye [KOH]
V) 4.15 kg 75% phosphoric acid [H$_3$PO$_4$] and
LA: 120 kg water
was spray granulated. The granulate obtained in this way was temperature treated in a rotary kiln for an average residence time of 2 h in a form gas atmosphere (5% by volume H2 in N2) at 600° C. An light grey product is obtained. The x-ray diffractogram (XRD) of the product is shown in FIG. 5. The product is a new structure type which appears to be closely linked to the KFe(PO$_4$) structure according to PDF card 01-076-4615.

Manufacturing Example 6—Crystal Water-Free KFe$_{0.75}$Zn$_{0.25}$(PO$_4$)

Figure 6:
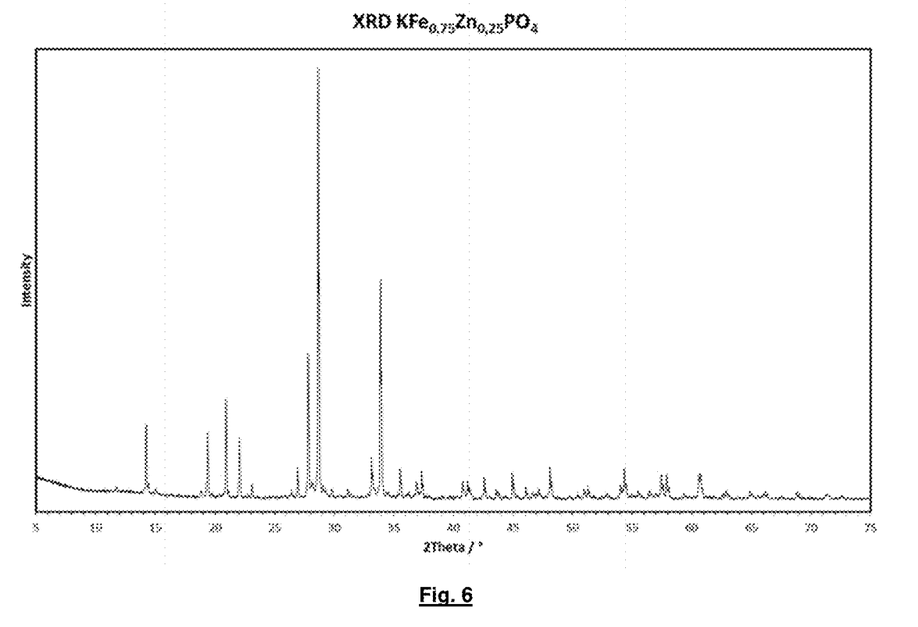
FIG. 6 shows the x-ray diffractogram of crystal water-free $KFe_{0.75}Zn_{0.25}(PO_4)$ manufactured according to the invention in line with manufacturing example 6.

A suspension of
i) 8.85 kg iron(III) oxide-hydroxide [FeO(OH) or Fe$_2$O$_3$ 1H$_2$O],
ii) 8.05 kg 98% phosphonic acid [H$_3$PO$_3$],
iii) 18.60 kg iron(III) phosphate dihydrate [FePO$_4$ 2H$_2$O]
IV) 5.40 kg zinc oxide [ZnO]
IV) 29.8 kg 50% lye [KOH]
V) 9.30 kg 75% phosphoric acid [H$_3$PO$_4$] and
LA: 120 kg water
was spray granulated. The granulate obtained in this way was temperature treated in a rotary kiln for an average residence time of 2 h in a form gas atmosphere (5% by volume H$_2$ in N$_2$) at 600° C. A light grey product is obtained. The x-ray diffractogram (XRD) of the product is shown in FIG. 6. The product is not known from the literature. It crystallises in an isotype manner to form KZn(PO$_4$) according to PDF card 01-081-1034.

Manufacturing Example 7—Crystal Water-Free KFe$_{0.75}$Mn$_{0.25}$(PO$_4$)

Figure 7:
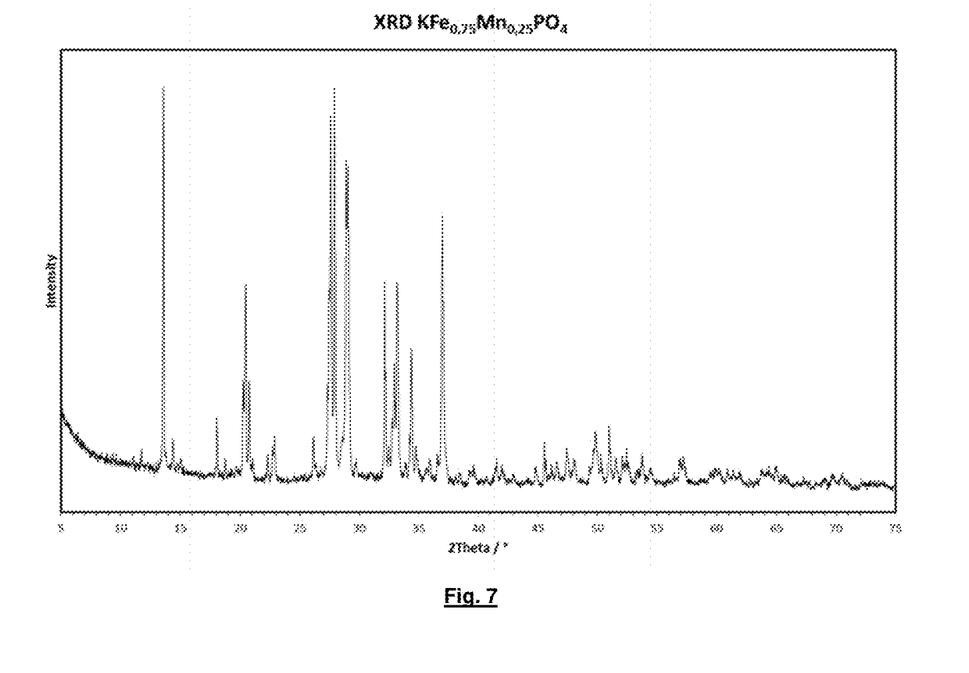
FIG. 7 shows the x-ray diffractogram of crystal water-free $KFe_{0.75}Mn_{0.25}(PO_4)$ manufactured according to the invention in line with manufacturing example 7.

A suspension of
i) 8.85 kg iron(III) oxide-hydroxide [FeO(OH) or Fe$_2$O$_3$ 1H$_2$O],
ii) 8.05 kg 98% phosphonic acid [H$_3$PO$_3$],
iii) 18.60 kg iron(III) phosphate dihydrate [FePO$_4$ 2H$_2$O]
IV) 8.85 kg manganese carbonate hydrate [MnCO$_3$ H$_2$O]
IV) 29.8 kg 50% lye [KOH]
V) 9.30 kg 75% phosphoric acid [H$_3$PO$_4$] and
LA: 140 kg water
was spray granulated. The granulate obtained in this way was temperature treated in a rotary kiln for an average residence time of 2 h in a form gas atmosphere (5% by volume H$_2$ in N$_2$) at 600° C. An light grey product is obtained. The x-ray diffractogram (XRD) of the product is shown in FIG. 7. The product is not known from the literature. It crystallises in an isotype manner to form KFe(PO$_4$) according to PDF card 01-076-4615.

Manufacturing Example 8—Crystal Water-Free BaFeP$_2$O$_7$

Figure 8:
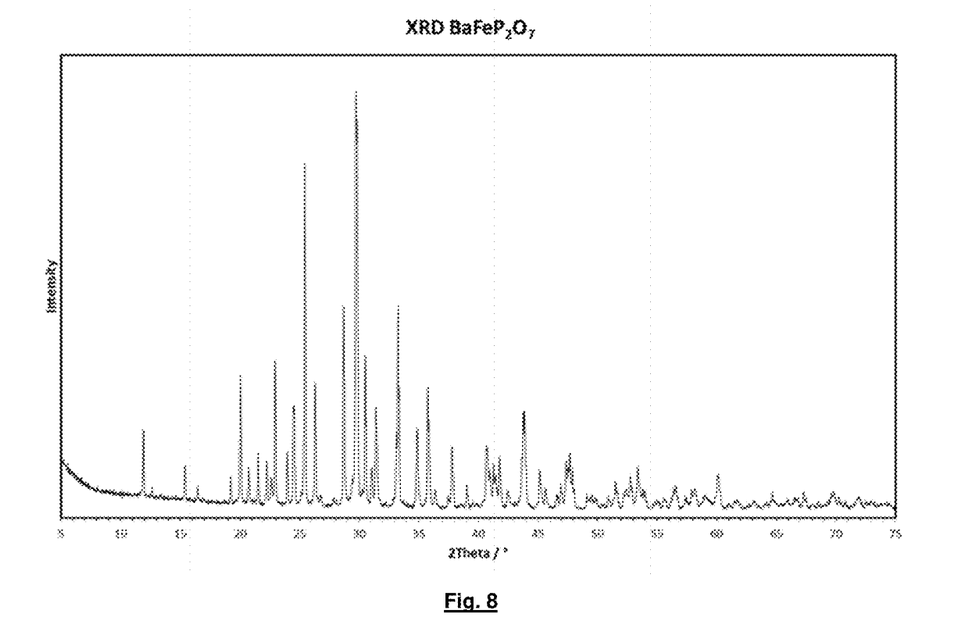
FIG. 8 shows the x-ray diffractogram of crystal water-free BaFeP2O7 manufactured according to the invention in line with manufacturing example 8.

A suspension of
i) 8.70 kg iron(III) oxide-hydroxide [FeO(OH) or Fe$_2$O$_3$ 1H$_2$O],
ii) 8.20 kg 98% phosphonic acid [H$_3$PO$_3$],
iii) 19.05 kg iron(III) phosphate dihydrate [FePO$_4$ 2H$_2$O]
IV) 63.09 kg barium hydroxide octahydrate [Ba(OH)$_2$ 8H$_2$O]
V) 26.15 kg 75% phosphoric acid [H$_3$PO$_4$] and
LA: 250 kg water
was spray granulated. The granulate obtained in this way was temperature treated in a rotary kiln for an average residence time of 4 h in a form gas atmosphere (5% by volume H$_2$ in N$_2$) at 800° C. A light grey product is obtained. The x-ray diffractogram (XRD) of the product is shown in FIG. 8. The product crystallises in an isotype manner to form BaCoP$_2$O$_7$ according to PDF card 01-084-1833.

The invention claimed is:
1. A method for the manufacture of
   crystal water-free iron(II) orthophosphate of the general formula Fe$_3$(PO$_4$)$_2$ or
   crystal water-free iron(II) metal orthophosphate, iron(II) metal pyrophosphate or iron(II) metal metaphosphate, each of which is represented by the general formula Fe$_a$Met$_b$(PO$_c$)$_d$, where a is a number from 1 to 5, b is a number from >0 to 5, c is a number from 2.5 to 5, d is a number from 0.5 to 3 and Met represents one or more metals selected from the group consisting of K, Rb, Cs, Mg, Ca, Sr, Ba, the transition metals (d block), the metals and semimetals of the third, fourth and fifth main groups, and the lanthanoids or combinations of the above mentioned phosphates with the stages:
a) manufacture of a mixture containing:
   i) iron compounds (A) selected from Fe(III) compounds, Fe(III)/Fe(II) compounds and mixtures of these in a percentage of 20% to 90% by weight of the mixture selected from the group consisting of oxides, hydroxides, oxide hydroxides, carbonates, carboxylates orthophosphates, phosphonates, metaphosphates, pyrophosphates, sulphates and mixtures of those mentioned above, ii) reduction agent (B) in a percentage of 5% to 50% by weight of the mixture selected from the group consisting of phosphonic acid [$H_3PO_3$], phosphorus trioxide [$P_2O_3$], phosphinic acid [$H_3PO_2$], phosphorus tetroxide [$P_2O_4$], hypodiphosphoric acid [$H_4P_2O_6$], diphosphoric acid [$H_4P_2O_5$], hypodiphosphonic acid [$H_4P_2O_4$], Fe salts and Met salts of the above mentioned acids and mixtures of the above as solids, aqueous solutions or suspensions, iii) optional phosphate donor (C) in a percentage of 0% to 50% by weight of the mixture selected from phosphoric acid [$H_3PO_4$] as an aqueous solution, metal phosphate [$Met_x(PO_4)_z$] or acid metal phosphate [$Met_xH_y(PO_4)_z$] with $1 \geq x \geq 4$, $1 \geq y \geq 5$ and $1 \geq z \geq 4$ as a solid or aqueous solution or suspension, diphosphoric acid [$H_4P_2O_7$], metaphosphoric acid [$(HPO_3)_n$] with $n \geq 3$ or their salts, phosphorus pentoxide [$P_2O_5$] or mixtures of the above, where Met is defined as above, iv) optional metal (Met) donor (D) in a percentage of 0% to 50% by weight of the mixture selected from metal compounds of one or more metals from the group consisting of K, Rb, Cs, Mg, Ca, Sr, Ba, the transition metals (d block), and the metals and semimetals of the third, fourth and fifth main group, and the lanthanoids, and selected from the oxides, hydroxides, oxide hydroxides, carbonates, oxalates, formates, acetates, citrates, lactates, orthophosphates, pyrophosphates and sulphates of the above mentioned metals and mixtures of these, whereby the share of the weight of components (A) to (D) of the mixture is based on the percentage of the substances not including any solvent and/or suspension agent, b) the mixture obtained, if it contains aqueous and/or organic solvents from step a), is dried at a temperature of 400° C. or less, c) the mixture, dry or dried in step b), is treated at a temperature in the range from 400 to 1200° C.

2. The method according to claim 1, wherein the drying in stage b) is carried out by convective drying at a temperature in the range from 100 to 400° C.

3. The method according to claim 1, wherein the temperature treatment in stage c) is carried out in an inert gas atmosphere or reducing gas atmosphere.

4. The method according to claim 1, wherein the temperature treatment in stage c) is carried out in a rotary kiln.

5. The method according to claim 1, wherein the temperature treatment in stage c) is carried out at a temperature in the range from 500 to 1100° C.

6. The method according to claim 1, wherein the iron(II) phosphate is crystal water-free iron(II) orthophosphate of the general formula $Fe_3(PO_4)_2$ and has the graftonite crystal structure.

7. The method according to claim 1, wherein the iron(II) phosphate is a mixed metal crystal water-free iron(II) metal orthophosphate of the general formula $Fe_aMet_b(PO_c)_d$, where Met represents one or a combination of the metals potassium (K), magnesium (Mg) and zinc (Zn).

8. The method according to claim 1, wherein the iron(II) phosphate is a mixed metal crystal water-free iron(II) metal pyrophosphate of the general formula $Fe_aMet_b(P_2O_7)_d$, where Met represents one or a combination of the metals calcium (Ca), strontium (Sr) and barium (Ba).

9. The method according to claim 1, wherein the Fe(II) and/or Fe(III)/Fe(II) compounds used as iron compound (A) are selected from oxides, oxide hydroxides, hydroxides, orthophosphates, pyrophosphates, metaphosphates and sulphates.

10. The method according to claim 1, wherein the product obtained in stage c) after temperature treatment is adjusted in terms of particle size.

11. The method according to claim 7, wherein the iron(II) metal orthophosphate is $KFePO_4$, $K(Fe_{0.90}Zn_{0.10})PO_4$, $K(Fe_{0.75}M_{no.25})PO_4$, $K(Fe_{0.75}Zn_{0.25})PO_4$ or $K(Fe_{0.75}Mg_{0.25})PO_4$.

12. The method according to claim 8, wherein the iron(II) metal pyrophosphate is $CaFeP_2O_7$, $SrFeP_2O_7$ or $BaFeP_2O_7$.

* * * * *